United States Patent
Horiguchi et al.

(10) Patent No.: US 12,227,031 B2
(45) Date of Patent: Feb. 18, 2025

(54) TIRE

(71) Applicant: Sumitomo Rubber Industries, Ltd., Kobe (JP)

(72) Inventors: Toshiki Horiguchi, Kobe (JP); Yoshifumi Kawagoe, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 35 days.

(21) Appl. No.: 18/104,873

(22) Filed: Feb. 2, 2023

(65) Prior Publication Data

US 2023/0271453 A1 Aug. 31, 2023

(30) Foreign Application Priority Data

Feb. 25, 2022 (JP) .................................. 2022-027770

(51) Int. Cl.
*B60C 11/03* (2006.01)
*B60C 11/04* (2006.01)
*B60C 11/12* (2006.01)

(52) U.S. Cl.
CPC ...... *B60C 11/0304* (2013.01); *B60C 11/0302* (2013.01); *B60C 11/04* (2013.01); *B60C 11/1236* (2013.01); *B60C 2011/0369* (2013.01)

(58) Field of Classification Search
CPC . B60C 11/0304; B60C 11/0302; B60C 11/04; B60C 11/1236; B60C 2011/0369; B60C 11/1204; B60C 2011/0367

See application file for complete search history.

(56) References Cited

U.S. PATENT DOCUMENTS

| 2003/0226629 | A1* | 12/2003 | Kimishima | ......... B60C 11/0306 |
| | | | | 152/209.18 |
| 2018/0141389 | A1* | 5/2018 | Yamaoka | ............ B60C 11/1272 |
| 2018/0170114 | A1* | 6/2018 | Hayashi | ............. B60C 11/1392 |

FOREIGN PATENT DOCUMENTS

JP 2015-168356 A 9/2015

\* cited by examiner

*Primary Examiner* — Justin R Fischer
*Assistant Examiner* — Brendon Charles Darby
(74) *Attorney, Agent, or Firm* — Birch, Stewart, Kolasch & Birch, LLP

(57) ABSTRACT

A tire includes a first middle land portion having circumferentially extending first and second longitudinal edges. The first middle land portion is provided with middle lateral grooves. At least one of the middle lateral grooves includes a first groove portion extending in the tire axial direction from the first longitudinal edge, and a second groove portion extending in the tire axial direction from the second longitudinal edge. The first groove portion and the second groove portion are offset in the tire circumferential direction to form a pair of circumferential groove edges between a pair of groove edges of the first groove portion and a pair of groove edges of the second groove portion. A maximum groove depth of the first groove portion is different from a maximum groove depth of the second groove portion.

17 Claims, 13 Drawing Sheets

TIRE

RELATED APPLICATIONS

This application claims the benefit of foreign priority to Japanese Patent Application No. JP2022-027770, filed Feb. 25, 2022, which are incorporated by reference in its entirety.

FIELD OF THE DISCLOSURE

The present disclosure relates to a tire.

BACKGROUND OF THE DISCLOSURE

Patent Document 1 below has proposed a tire that includes middle land portions provided with a plurality of middle lateral grooves. The middle lateral grooves are provided with tie-bars in which groove bottoms raise locally. The tire is expected to improve on-snow performance while maintaining stability on dry roads.

PATENT DOCUMENT

[Patent document 1] Japanese Unexamined Patent Application Publication 2015-168356

SUMMARY OF THE DISCLOSURE

In recent years, as the performance of power units of vehicles has improved, there has been a demand for further improvements in terms of on-snow performance while maintaining steering stability on dry roads.

The present disclosure has been made in view of the above circumstances and has a main object to provide a tire capable of exerting excellent on-snow performance while maintaining steering stability on dry roads.

In one aspect of the present disclosure, a tire includes a tread portion including a first tread edge, a second tread edge, a first middle land portion arranged between the first tread edge and the second tread edge. The first middle land portion includes a first longitudinal edge extending in a tire circumferential direction on a first tread edge side, a second longitudinal edge extending in the tire circumferential direction on a second tread edge side, and a ground contact surface between the first longitudinal edge and the second longitudinal edge. The first middle land portion is provided with a plurality of middle lateral grooves that traverses the first middle land portion completely in a tire axial direction. At least one of the plurality of middle lateral grooves includes a first groove portion extending in the tire axial direction from the first longitudinal edge, and a second groove portion extending in the tire axial direction from the second longitudinal edge. The first groove portion and the second groove portion are offset in the tire circumferential direction to form a pair of circumferential groove edges extending in the tire circumferential direction between a pair of groove edges of the first groove portion and a pair of groove edges of the second groove portion. A maximum groove depth of the first groove portion is different from a maximum groove depth of the second groove portion.

DETAILED DESCRIPTION OF THE DISCLOSURE

One or more embodiments of the present disclosure will be described below with reference to the drawings.

Figure 1:
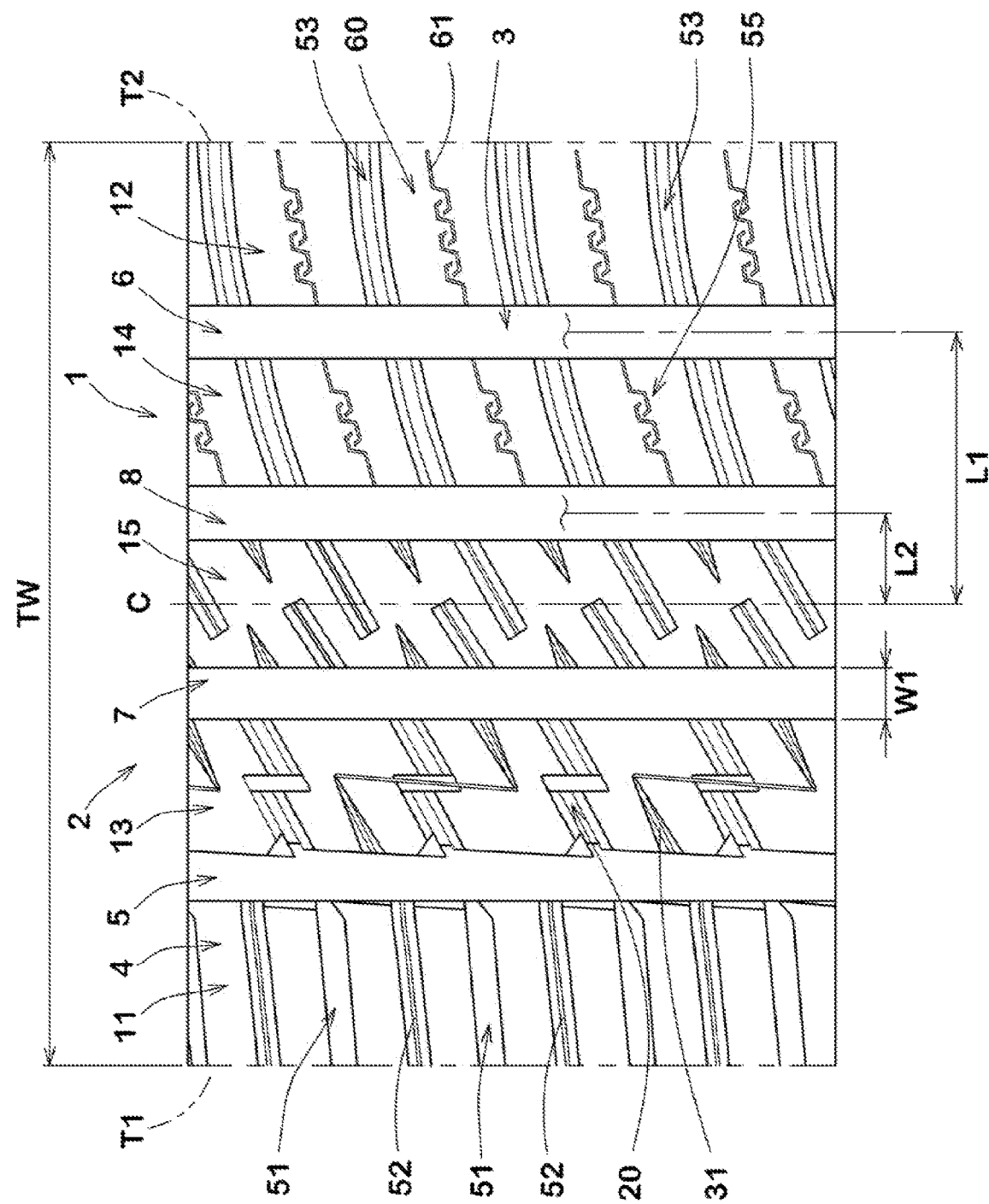
FIG. 1 is a development view of a tread portion showing an embodiment of the present disclosure.

FIG. 1 is a development view of a tread portion 2 of a tire 1 showing an embodiment of the present disclosure. The tire 1 according to the present embodiment, for example, is embodied as a winter tire and may be suitably used as a pneumatic tire for passenger cars. However, the present disclosure is not limited to such an embodiment, and may be applied to heavy-duty pneumatic tires and non-pneumatic tires in which the interior of the tire is not filled with pressurized air.

As illustrated in FIG. 1, the tread portion 2 according to the present disclosure includes a first tread edge T1, a second tread edge T2, a plurality of circumferential grooves 3 extending continuously in the tire circumferential direction between the first tread edge T1 and the second tread edge T2, and a plurality of land portions 4 divided by the circumferential grooves 3. As a preferred embodiment, the tire 1 according to the present embodiment is configured as a so-called five-rib tire in which the tread portion 2 is composed of four circumferential grooves 3 and five land portions 4.

In the present embodiment, the tread portion 2, for example, has a designated mounting direction on a vehicle. Thus, the first tread edge T1 is intended to be positioned outside the vehicle when installed, and the second tread edge T2 is intended to be positioned inside the vehicle when installed. The mounting direction on a vehicle is indicated, for example, by letters or symbols on a sidewall portion (not illustrated) of the tire 1. However, the tire 1 according to the present disclosure is not limited to such an embodiment and may be used without specifying the mounting direction on a vehicle.

The first tread edge T1 and the second tread edge T2 are the axial outermost edges of the ground contacting patch of the tire 1 which occurs under the condition such that the tire 1 under a normal state is grounded on a plane by zero camber angles with 70% of a standard tire load.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, the dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. Also, in the case of tires for which various standards are not specified, "standard tire load" refers to the maximum load that can be applied when using the tire according to the above-mentioned standards.

The circumferential grooves 3 include a first shoulder circumferential groove 5 and a second shoulder circumferential groove 6. Further, the circumferential grooves 3 include a first crown circumferential groove 7 and a second crown circumferential groove 8, which are arranged between the first and second shoulder circumferential grooves 5 and 6. The first shoulder circumferential groove 5 is located nearest to the first tread edge T1 among the circumferential grooves 3. The second shoulder circumferential groove 6 is located nearest to the second tread edge T2 among the circumferential grooves 3. The first crown circumferential groove 7 is located between the first shoulder circumferential groove 5 and the tire equator C. The second crown circumferential groove 8 is located between the second shoulder circumferential groove 6 and the tire equator C.

Preferably, a distance L1 in the tire axial direction from the tire equator C to the groove centerline of the first shoulder circumferential groove 5 or the second shoulder circumferential groove 6 is, for example, in a range from 25% to 35% of the tread width TW. Preferably, a distance L2 in the tire axial direction from the tire equator C to the groove centerline of the first crown circumferential groove 7 or the second crown circumferential groove 8 is, for example, in a range from 5% to 15% of the tread width TW. Note that the tread width TW is the distance from the first tread edge T1 to the second tread edge T2 in the tire axial direction under the normal state.

In the present embodiment, the second shoulder circumferential groove 6, the first crown circumferential groove 7, and the second crown circumferential groove 8 each extend in a straight manner in parallel with the tire circumferential direction. On the other hand, the first shoulder circumferential groove 5 has a zigzag groove edge on the tire equator C side. However, each of the circumferential grooves 3 is not limited to such a shape.

The circumferential grooves 3 have a groove width W1 which is preferably equal to or more than 3 mm. In addition, the groove width W1 of the circumferential grooves 3, for example, is preferably in a range from 3.0% to 7.0% of the tread width TW. A groove depth of the circumferential grooves 3 is in a range from 5 to 10 mm for passenger car tires, for example.

The land portions 4 according to the present embodiment include a first middle land portion 13 located between the first tread edge T1 and the second tread edge T2. In some preferred embodiments, the first middle land portion 13 is located between the first tread edge T1 and the tire equator C and is specifically sectioned between the first shoulder circumferential groove 5 and the first crown circumferential groove 7. Further, the land portions 4 according to the present embodiment include a first shoulder land portion 11, a second shoulder land portion 12, a second middle land portion 14 and a crown land portion 15. The first shoulder land portion 11 includes the first tread edge T1 and is adjacent to the first middle land portion 13 via the first shoulder circumferential groove 5. The second shoulder land portion 12 includes the second tread edge T2 and is located outwardly in the tire axial direction of the second shoulder circumferential groove 6. The second middle land portion 14 is located between the second tread edge Te and the tire equator C, and specifically is sectioned between the second shoulder circumferential groove 6 and the second crown circumferential groove 8. The crown land portion 15 is sectioned between the first crown circumferential groove 7 and the second crown circumferential groove 8 and thus is located on the tire equator C.

Figure 2:
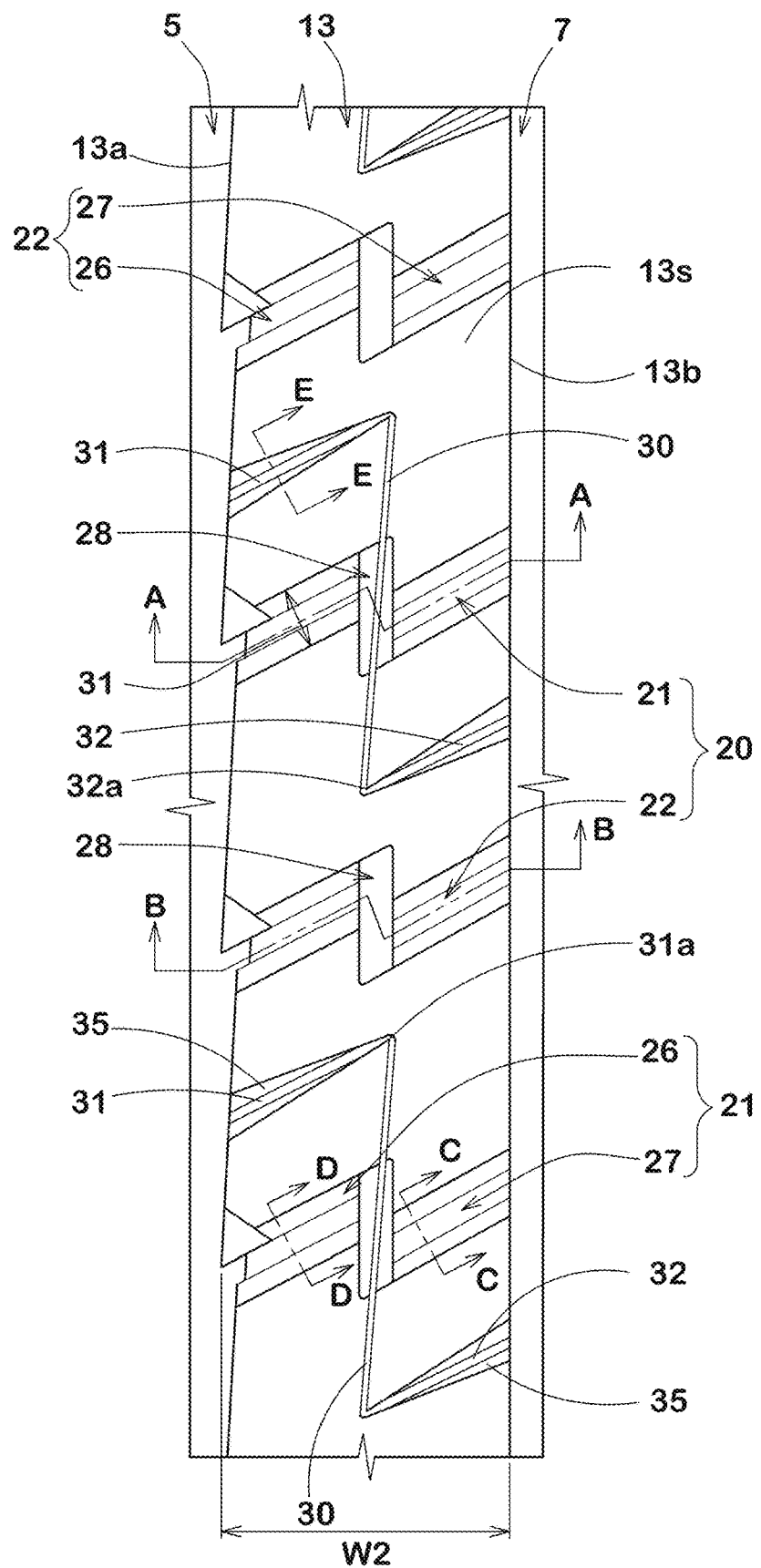
FIG. 2 is an enlarged view of a first middle land portion of FIG. 1.

FIG. 2 illustrates an enlarged view of the first middle land portion 13. As illustrated in FIG. 2, the first middle land portion 13 includes a first longitudinal edge 13a extending in the tire circumferential direction on the first tread edge T1 side, a second longitudinal edge 13b extending in the tire circumferential direction on the second tread edge T2 side, and a ground contact surface 13s between the first longitudinal edge 13a and the second longitudinal edge 13b. In addition, the first middle land portion 13 is provided with a plurality of middle lateral grooves 20.

Figure 3:
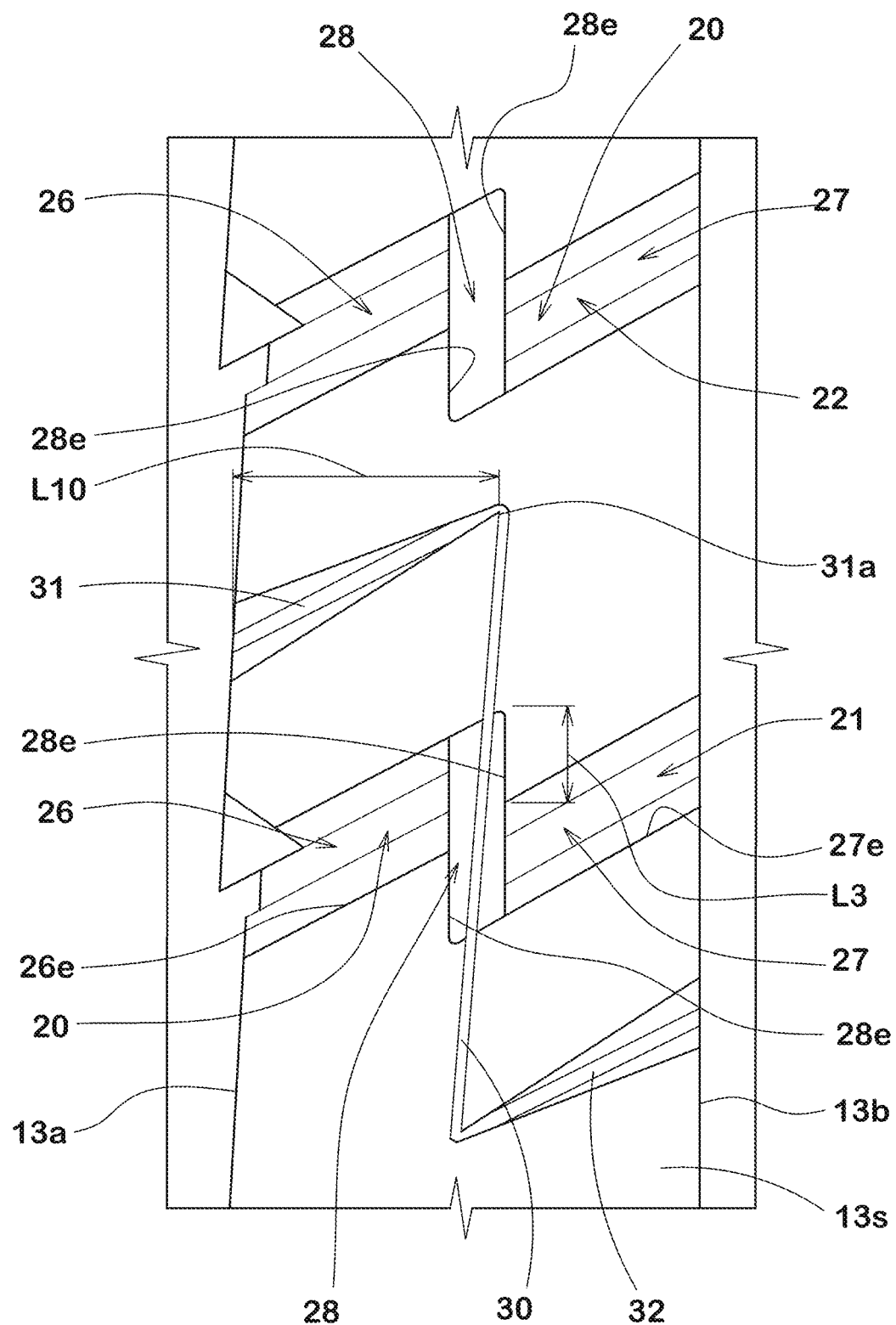
FIG. 3 is an enlarged view of a first middle lateral groove and a second middle lateral groove.

FIG. 3 illustrates an enlarged view of two middle lateral grooves 20. Note that FIG. 3 is an enlarged view of a first middle lateral groove 21 and a second middle lateral groove 22 which will be described later. As illustrated in FIG. 3, at least one of the middle lateral grooves 20 includes a first groove portion 26 and a second groove portion 27. The first groove portion 26 extends from the first longitudinal edge 13a in the tire axial direction. The second groove portion 27 extends from the second longitudinal edge 13b in the tire axial direction.

In the present disclosure, the first groove portion 26 and the second groove portion 26 are offset in the tire circumferential direction to form a pair of circumferential groove edges 28e extending in the tire circumferential direction between a pair of groove edges 26e of the first groove portion 26 and a pair of groove edges 27e of the second groove portion 27. In addition, the maximum groove depth of the first groove portion 26 is different from the maximum groove depth of the second groove portion 27. The tire in accordance with the present disclosure, by adopting the above-mentioned structure, can exert excellent on-snow performance while maintaining steering stability on dry roads (hereinafter, it may be simply referred to as "steering stability"). The reason for this is presumed to be the following mechanism.

When driving on snow, the middle lateral grooves 20 can compress snow inside the grooves and shear it, thereby providing a large reaction force (such reaction force may be sometimes referred to as "snow column shearing force"). Since the maximum groove depths of the first groove portion 26 and the second groove portion 27 are different from each other, the groove with the smaller maximum depth can maintain the rigidity of the first middle land portion 13 and thus the steering stability can be maintained. On the other hand, the groove with the greater maximum groove depth can provide a larger snow column shearing force, which can improve on-snow performance.

In addition, the pair of circumferential groove edges 28e described above can provide frictional force in the tire axial direction and help to improve cornering performance on snow. Furthermore, the combination of the circumferential groove edges 28e, the first groove portion 26, and the second groove portion 27 described above can compress the snow entering the groove with the greater maximum depth more strongly in the tire axial direction to generate a powerful snow column shearing force. It is considered that the tire 1 according to the present disclosure can exert excellent on-snow performance while maintaining the steering stability by such a mechanism.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, improvements of the respective performance based on the additional configuration can be expected.

As illustrated in FIG. 2 and FIG. 3, in the present embodiment, each of the middle lateral grooves 20 has the above-mentioned structure. In a tread plan view, the first groove portions 26 and the second groove portions 27 extend in the tire axial direction with a constant groove width W3 (shown in FIG. 2). The groove width W3 of the first groove portions 26 and the second groove portions 27, for example, ranges from 15% to 25% of a width W2 (shown in FIG. 2) in the tire axial direction of the ground contact surface 13s of the first middle land portion 13. An angle of the first groove portions 26 and the second groove portions 27 ranges from 25 to 35 degrees with respect to the tire axial direction, for example.

The middle lateral grooves 20 include a plurality of first middle lateral grooves 21 and a plurality of second middle lateral grooves 22 which have different distribution of groove depths from each other. The first middle lateral grooves 21 and the second middle lateral grooves 22 are arranged alternately in the tire circumferential direction.

Figure 4:
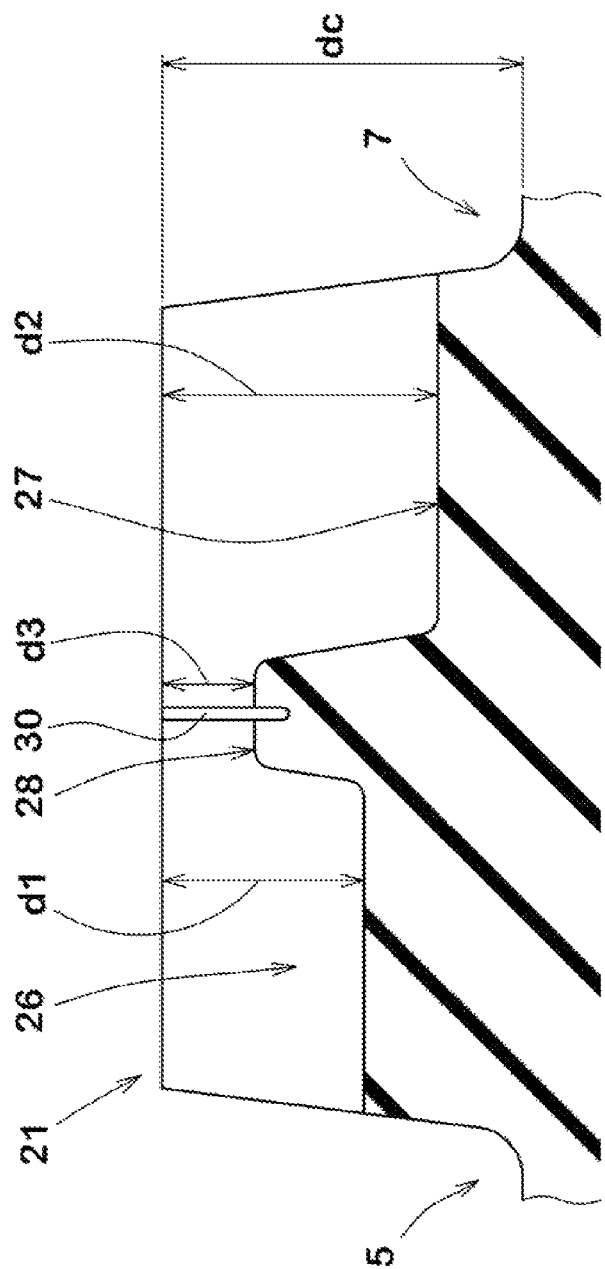
FIG. 4 is a cross-sectional view taken along the line A-A of FIG. 2.
Figure 5:
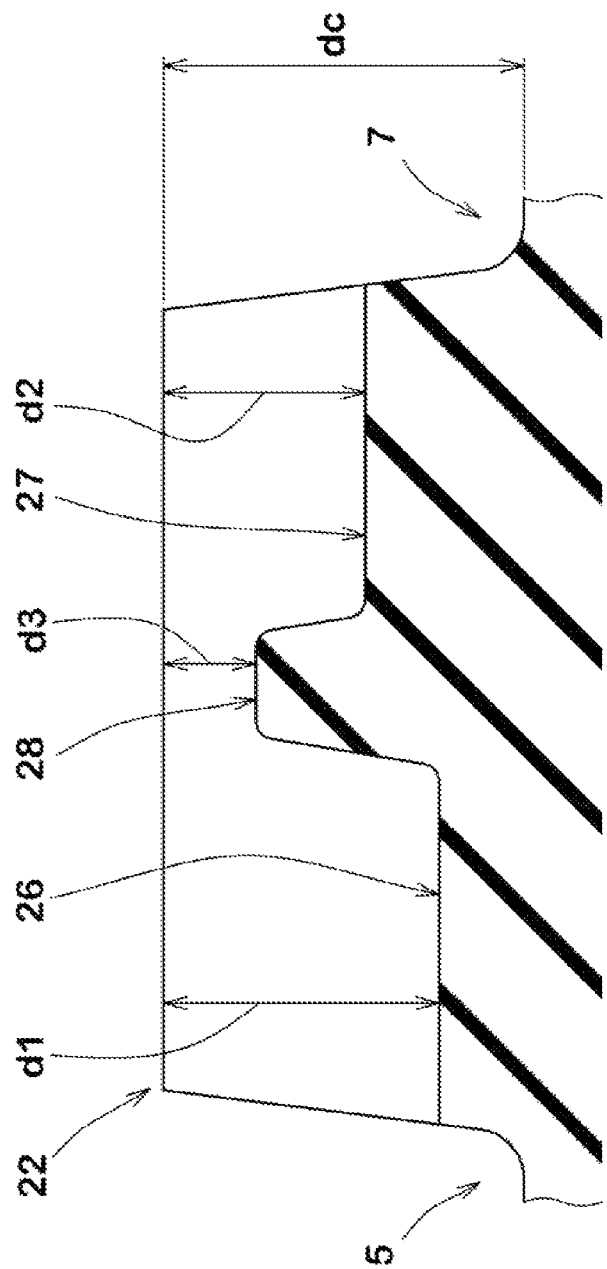
FIG. 5 is a cross-sectional view taken along the line B-B of FIG. 2.

FIG. 4 illustrates a cross-sectional view taken along the line A-A of FIG. 2. FIG. 4 is a cross-sectional view of one of the first middle lateral grooves 21 along a groove longitudinal direction thereof. FIG. 5 illustrates a cross-sectional view taken along the line B-B of FIG. 2. FIG. 5 is a cross-sectional view of one of the second middle lateral grooves 22 along a groove longitudinal direction thereof. As illustrated in FIG. 4 and FIG. 5, in the present embodiment, the first groove portions 26 and the second groove portions 27 of the first middle lateral grooves 21 and the first groove portions 26 and the second groove portions 27 of the second middle lateral grooves 22 extend in the groove longitudinal direction with respective constant groove depths.

As illustrated in FIG. 4, in each first middle lateral groove 21, the maximum groove depth $d1$ of the first groove portion 26 is smaller than the maximum groove depth $d2$ of the second groove portion 27. In each of the first middle lateral grooves 21, the groove depth $d2$ of the second groove portion 27, for example, ranges from 60% to 80% of a groove depth $dc$ of the first crown circumferential groove 7. Further, in each of the first middle lateral grooves 21, the groove depth $d1$ of the first groove portion 26 ranges from 40% to 60% of the groove depth $dc$ of the first crown circumferential groove 7. Preferably, the groove depth $d1$ of the first groove portion 26 ranges from 60% to 70% of the groove depth $d2$ of the second groove portion 27.

As illustrated in FIG. 5, the second middle lateral groove 22 has substantially the inverted shape of the first middle lateral groove 21. That is, in each of the second middle lateral grooves 22, the maximum groove depth $d1$ of the first groove portion 26 is greater than the maximum groove depth $d2$ of the second groove portion 27. In each of the second middle lateral grooves 22, the groove depth $d1$ of the first groove portion 26, for example, ranges from 60% to 80% of the groove depth $dc$ of the first crown circumferential groove 7. Further, in each of the second middle lateral grooves 22, the groove depth $d2$ of the second groove portion 27 ranges from 40% to 60% of the groove depth $dc$ of the first crown circumferential groove 7. Preferably, the groove depth $d2$ of the second groove portion 27 ranges from 60% to 70% of the groove depth $d1$ of the first groove portion 26.

In the present embodiment, since the first middle lateral grooves 21 and the second middle lateral grooves 22 are provided alternately in the tire circumferential direction, the steering stability and on-snow performance can be improved in a well-balanced manner.

Figure 6:
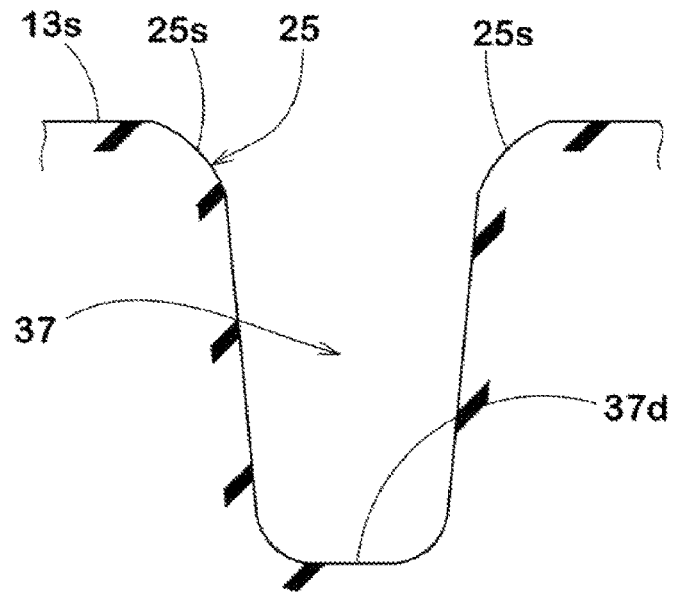
FIG. 6 is a cross-sectional view taken along the line C-C of FIG. 2.
Figure 7:
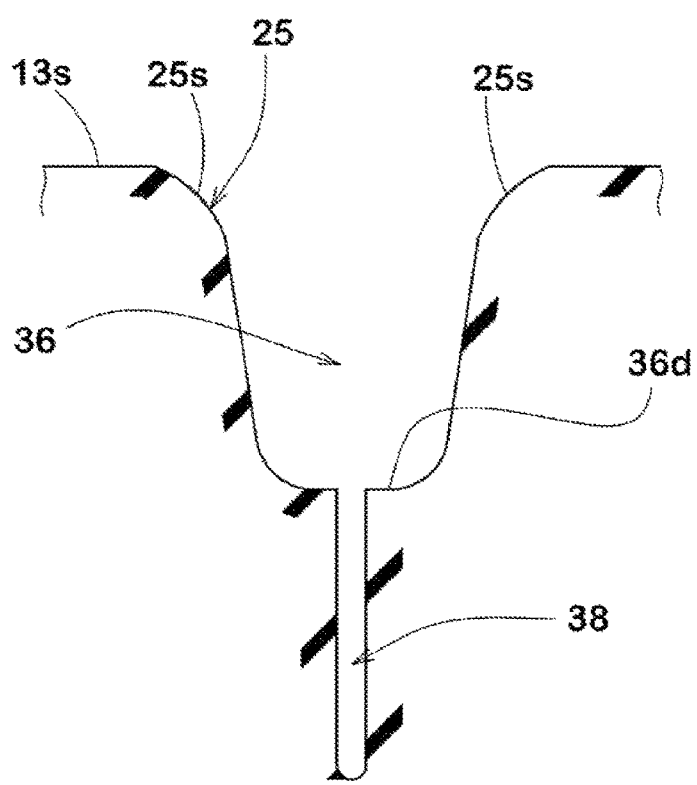
FIG. 7 is a cross-sectional view taken along the line D-D of FIG. 2.

FIG. 6 illustrates a cross-sectional view taken along the line C-C of FIG. 2. FIG. 6 is a cross-sectional view of the second groove portion 27 of each of the first middle lateral grooves 21, or the first groove portion 26 of each of the second middle lateral grooves 22 (hereinafter, sometimes referred to collectively as deep groove portion 37). FIG. 7 illustrates a cross-sectional view take along the line D-D of FIG. 2. FIG. 7 is a cross-sectional view of the first groove portion 26 of each of the first middle lateral grooves 21, or the second groove portion 27 of each of the second middle lateral grooves 22 (hereinafter, sometimes referred to collectively as shallow groove portion 36).

As illustrated in FIG. 6 and FIG. 7, the deep groove portion 37 and the shallow groove portion 36 preferably open at the ground contact surface via chamfer portions 25. Each chamfer portion 25 includes an inclined surface 25s between the ground contact surface 13s and one of the groove walls. In the present embodiment, each inclined surface 25s is slightly curved in a direction convex outward in the tire radial direction. The inclined surface 25s may, for example, be planar. Such a chamfer portion 25 can help to equalize the ground pressure acting on the ground contact surface 13s to improve uneven wear resistance.

As illustrated in FIG. 6, the deep groove portion 37, for example, is configured to include a flat groove bottom 37d. On the other hand, as illustrated in FIG. 7, the shallow groove portion 36 includes a groove bottom 36d which is provided with a groove bottom sipe 38 extending inwardly in the tire radial direction. The definition of "sipe" will be discussed later. Such a groove bottom sipe 38 can facilitate the opening of the shallow groove portion 36 appropriately and help to improve on-snow performance. Note that the above-mentioned depths d1 and d2 of the first groove portion 26 of each first middle lateral groove 21 and the second groove portion 27 of each second middle lateral groove 22, respectively, mean a depth excluding the groove bottom sipe 38. In addition, in FIG. 4 and FIG. 5, the groove bottom sipes 38 are not illustrated. In some preferred embodiments, a total depth from the ground contact surface 13s to a bottom of the groove bottom sipe 38 is also smaller than a depth of the deep groove portion 37. This can improve the balance between steering stability and on-snow performance.

In the present embodiment as illustrated in FIG. 3, each of the pair of groove edges of each middle lateral groove 20 includes a respective one of the pair of circumferential groove edges 28e. The pair of circumferential groove edges 28e, for example, is located in the central area when the ground contact surface 13s of the first middle land portion 13 is divided into three equal portions in the tire axial direction. In the present embodiment, the pair of circumferential groove edges 28e is positioned such that the axial center position of the ground contact surface 13s of the first middle land portion 13 is located therebetween. In addition, the pair of circumferential groove edges 28e extends along the tire circumferential direction, preferably extending in parallel with the tire circumferential direction. For example, an angle of the pair of circumferential groove edges 28e is preferably equal to or less than 10 degrees, more preferably equal to or less than 5 degrees with respect to the tire circumferential direction. Preferably, a length L3 in the tire circumferential direction of each circumferential groove edge 28e is smaller than the maximum width of the first groove portion 26 and the second groove portion 27. Specifically, the length L3 ranges from 75% to 95% of the maximum groove width. Such a circumferential groove edge 28e can improve cornering performance when driving on snow, while suppressing uneven wear of the land portion.

Each middle lateral groove includes a circumferential groove portion 28 located between the first groove portion 26 and the second groove portion 27. In the present embodiment, the area between one of the pair of circumferential groove edge 28e and its imaginary extension line extending in a longitudinal direction thereof and the other one of the pair of circumferential groove edge 28e and its imaginary extension line extending in a longitudinal direction thereof is configured as the circumferential groove portion 28.

As illustrated in FIG. 4 and FIG. 5, the maximum groove depth d3 of the circumferential groove portions 28 is smaller than the maximum groove depth d1 of the first groove portions 26 and the maximum groove depth d2 of the second groove portions 27. Specifically, the maximum groove depth d3 of the circumferential groove portions 28 ranges from 20% to 30% of the groove depth dc of the first crown circumferential groove 7. The circumferential groove portions 28 can increase the rigidity of a middle region of the first middle land portion 13 and improve uneven wear resistance.

As illustrated in FIG. 2, it is preferable that the first middle land portion 13 is provided with at least one circumferential sipe 30 extending in the tire circumferential direction. In the present embodiment, the first middle land portion 13 is provided with a plurality of circumferential sipes 30 spaced in the tire circumferential direction.

As used herein, "sipe" means a groove-shaped body (a recess having a longitudinal direction, including grooves) having a small width and includes a main body portion thereof having a width between two opposite inner walls being 1.5 mm or less. Further, the main body portion means a portion in which two opposite inner walls extend parallel or substantially parallel to each other in the tire radial direction. Here, "substantially parallel" means that the angle between two opposite inner walls is 10 degrees or less. As will be described later, sipe may be provided with one or more chamfer portions. Further, sipe may have a so-called flask bottom with an increased width at the bottom. Note that in the present embodiment, the circumferential sipes 30 extend in the tire radial direction from the ground contact surface 13s to respective bottoms thereof with a constant width.

Preferably, each circumferential sipe 30, for example, is located in the central area when the ground contact surface 13s of the first middle land portion 13 is divided into three equal portions in the tire axial direction. An angle of each circumferential sipe 30 with respect to the tire circumferential direction is, for example, equal to or less than 10 degrees, preferably equal to or less than 5 degrees. Such a circumferential sipe 30 can provide a large frictional force in the tire axial direction when driving on snow.

Each of the circumferential sipes 30, for example, extends across a respective one of the middle lateral grooves 20 in the tire circumferential direction. In some preferred embodiments, the circumferential sipes 30 are arranged to extend across the respective first middle lateral grooves 21 but not to be communicated with the second middle lateral grooves 22. More specifically, the circumferential sipes 30 extend across the respective circumferential groove portions 28 of the first middle lateral grooves 21. Thus, at the groove bottoms of the circumferential groove portions 28, the circumferential sipes 30 are formed as the groove bottom sipes. On the other hand, the second middle lateral grooves 22 do not have such a structure. As a result, the steering stability, on-snow performance, and uneven wear are resistance can be improved in a well-balanced manner.

As illustrated in FIG. 2, the first middle land portion 13 is further provided with a plurality of first middle sipes 31 and a plurality of second middle sipes 32. The first middle sipes 31 extend from the first longitudinal edge 13a and are in communication with the respective circumferential sipes 30. The second middle sipes 32 extend from the second longitudinal edge 13b and are in communication with the respective circumferential sipes 30. In some preferred embodiments, terminal ends 31a of the first middle sipes 31 in the ground contact surface 13s are connected to ends on a first side in the tire circumferential direction of the respective circumferential sipes 30. Terminal ends 32a of the second middle sipes 32 in the ground contact surface 13s are connected to ends on a second side in the tire circumferential direction of the respective circumferential sipes 30. The first middle sipes 31 and the second middle sipes 32 work together with the circumferential sipe 30 to provide multi-directional frictional force, further improving on-snow performance.

The first middle sipes 31 and the second middle sipes 32, for example, are inclined with respect to the tire axial direction in the same direction as the middle lateral grooves 20. An angle of these sipes with respect to the tire axial direction, for example, ranges from 25 to 35 degrees. In some preferred embodiments, an angle between the first middle sipes 31 and the circumferential sipes 30 is an acute angle. Similarly, an angle between the second middle sipes 32 and the circumferential sipes 30 is an acute angle. This makes it easier for the corners between the middle sipes and the circumferential sipes to bite into a road surface when driving on snow, thereby exhibiting excellent performance on snow.

Figure 8:
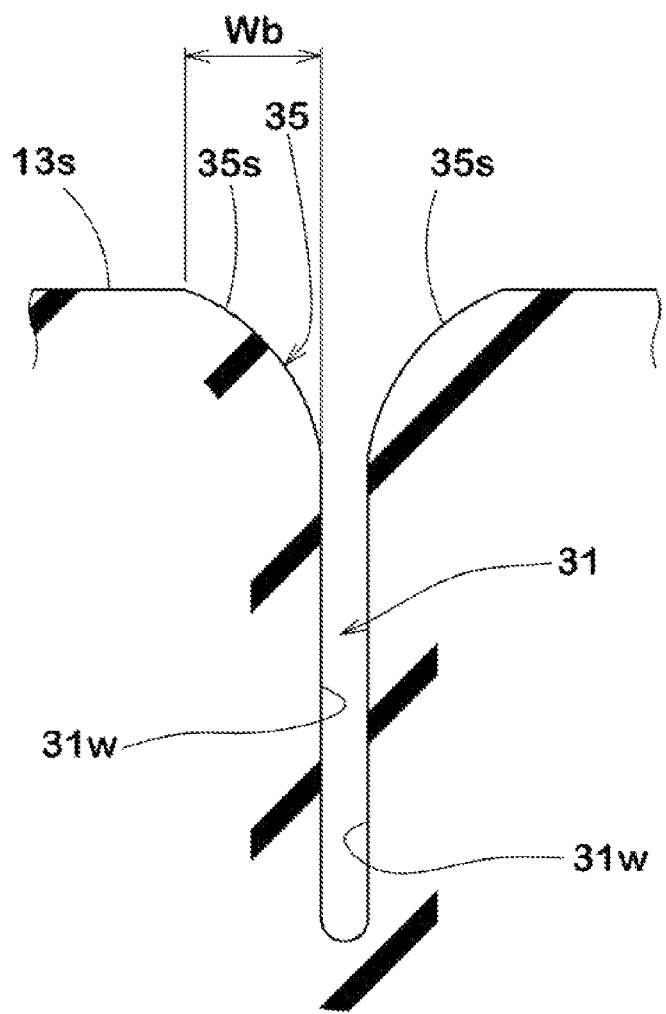
FIG. 8 is a cross-sectional view taken along the line E-E of FIG. 2.

FIG. 8 illustrates a cross-sectional view taken along the line E-E of FIG. 2. FIG. 8 is a cross-sectional view of the first middle sipes 31, and the configuration described below can be applied to the second middle sipes 32. As illustrated in FIG. 8, the first middle sipes 31 open at the ground contact surface 13s via chamfer portions 35. Each chamfer portion 35 includes an inclined surface 35s between the ground contact surface 13s and one of the sipe walls 31w. In the present embodiment, each inclined surface 35s is slightly curved in a direction convex outward in the tire radial direction. The inclined surface 45s may, for example, be planar. Such chamfer portions 35 help to equalize the ground contact pressure acting on the ground contact surface 13s, improving the steering stability and uneven wear resistance.

As illustrated in FIG. 2, it is preferable that a chamfer width of the chamfer portions 35 of the first middle sipes 31 decreases toward the circumferential sipe 30 side such that each first middle sipe 31 has an opening width at the ground contact surface 13s which decreases toward the terminal end 31a of the first middle sipe 31. Similarly, it is preferable that a chamfer width of the chamfer portions 35 of the second middle sipes 32 decreases toward the circumferential sipe 30 side such that each second middle sipe 32 has an opening width at the ground contact surface 13s which decreases toward the terminal end 32a of the second middle sipe 32. This ensures the ground contact area in a center region of the first middle land portion 13 and can maintain the steering stability. The chamfer width is a width Wb in a direction orthogonal to the longitudinal direction of the sipe (shown in FIG. 8) of the chamfer portion in a tread plan view.

Figure 9:
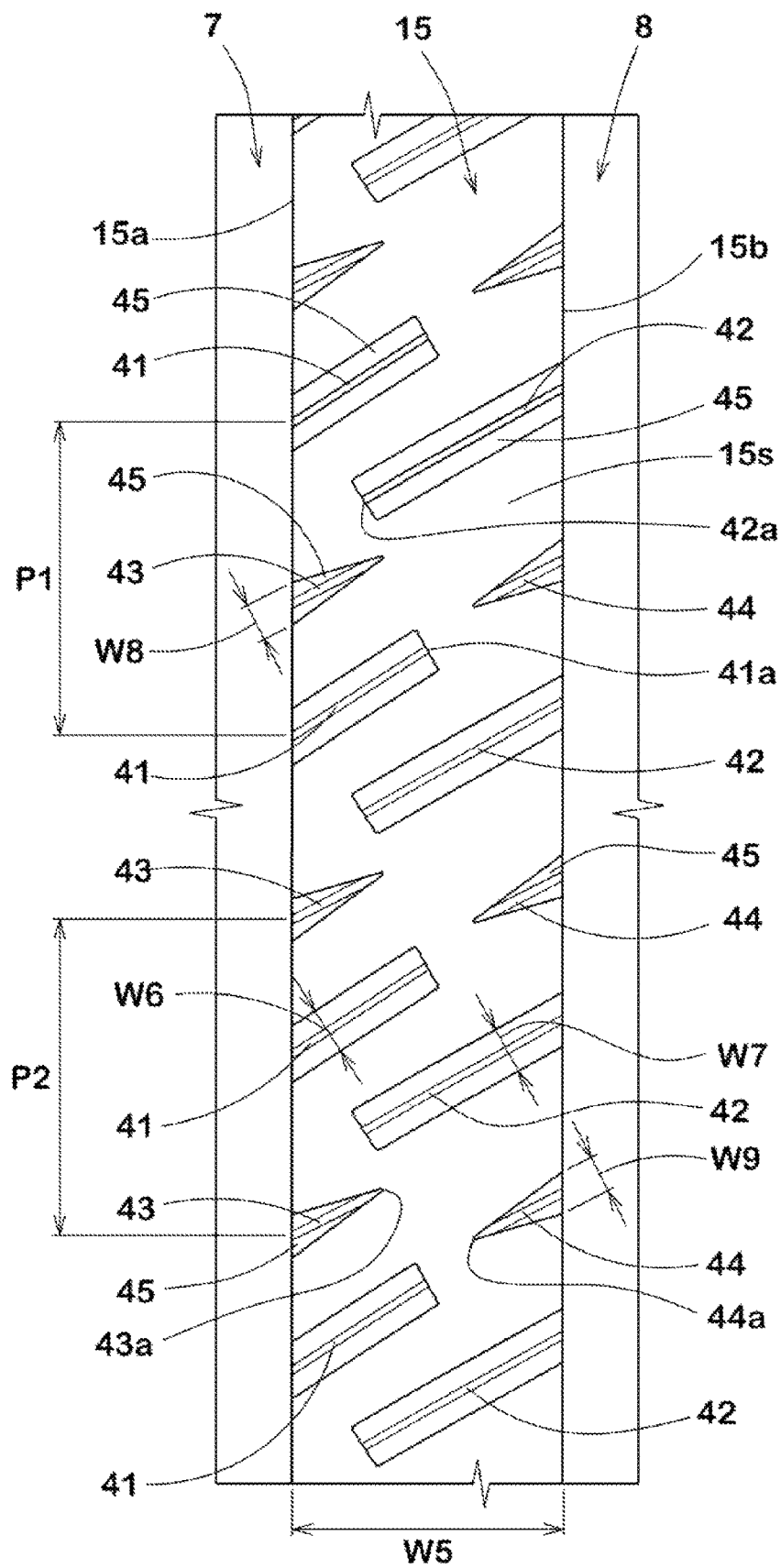
FIG. 9 is an enlarged view of a crown land portion of FIG. 1.

FIG. 9 illustrates an enlarged view of the crown land portion 15 of FIG. 1. The crown land portion 15 includes a first longitudinal edge 15a extending in the tire circumferential direction on a first tread edge T1 side, a second longitudinal edge 15b extending in the tire circumferential direction on a second tread edge T2 side, and a ground contact surface 15s between the first longitudinal edge 15a and the second longitudinal edge 15b. In addition, the crown land portion 15 is provided with a plurality of first crown sipes 41, a plurality of second crown sipes 42, a plurality of third crown sipes 43, and a plurality of fourth crown sipes 44.

Figure 10:
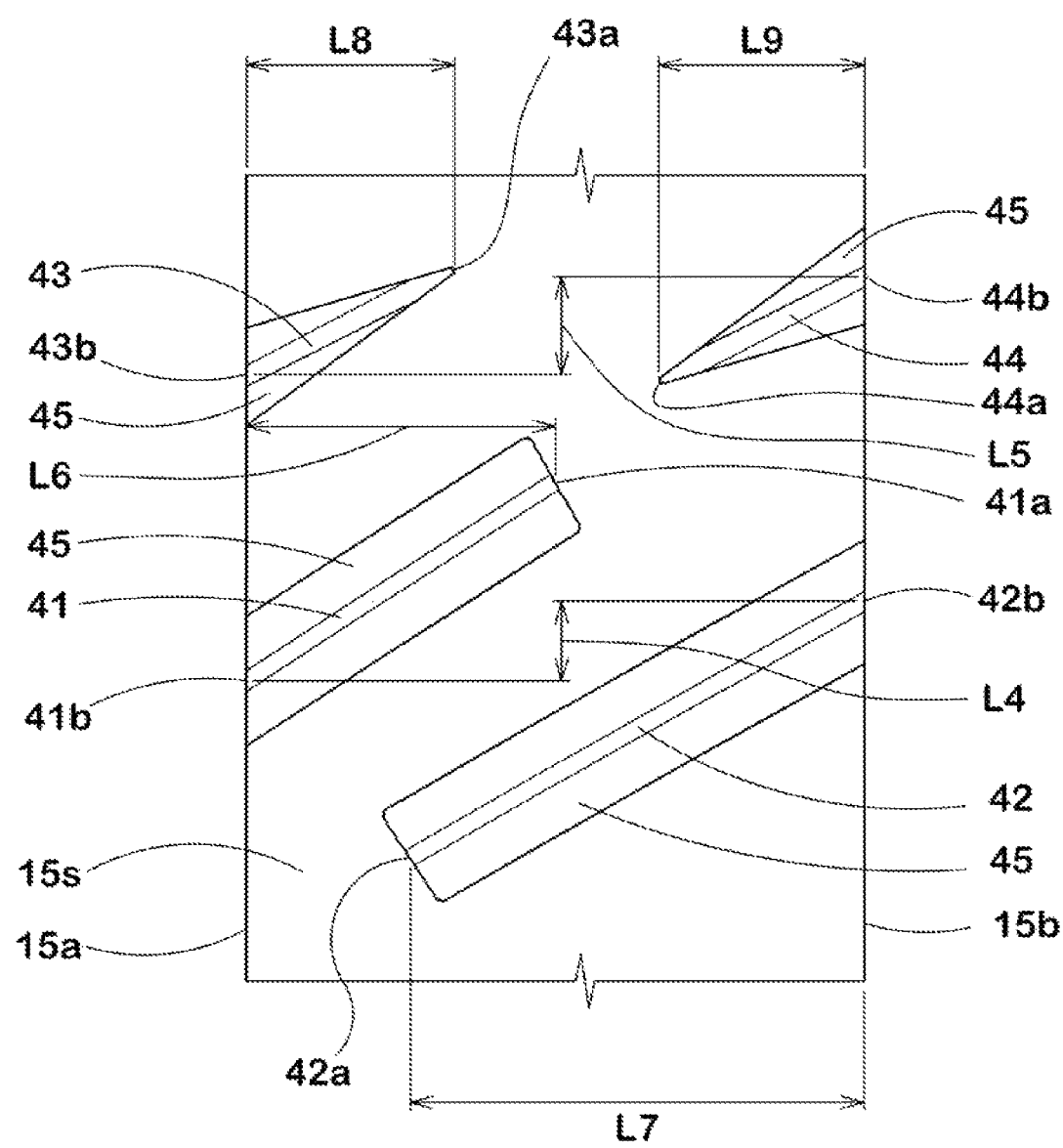
FIG. 10 is an enlarged view of a first crown sipe, a second crown sipe, a third crown sipe and a fourth crown sipe of FIG. 9.

FIG. 10 illustrates an enlarged view of one of the first crown sipes 41, one of the second crown sipes 42, one of the third crown sipes 43, and one of the fourth crown sipes 44. As illustrated in FIG. 10, these sipes are inclined at an angle with respect to the tire axial direction in the same direction with each other. In some preferred embodiments, these sipes are inclined in the same direction with respect to the tire axial direction as with the middle lateral grooves 20 (shown in FIG. 2). An angle of these sipes, for example, ranges from 25 to 35 degrees with respect to the tire axial direction.

The first crown sipes 41 extend from the first longitudinal edge 15a and have closed ends 41a in the ground contact surface 15s. The second crown sipes 42 extend from the second longitudinal edge 15b and have closed ends 42a in the ground contact surface 15s. The third crown sipes 43 extend from the first longitudinal edge 15a and have closed ends 43a in the ground contact surface 15s. In a tread plan view, the third crown sipes 43 have a shape different from the first crown sipes 41. The fourth crown sipes 44 extend from the second longitudinal edge 15b and have closed ends 44a in the ground contact surface 15s. In a tread plan view, the fourth crown sipes 44 have a shape different from the second crown sipes 42.

In the present embodiment, a minimum distance L4 in the tire circumferential direction between outer ends 41b on the first longitudinal edge 15a side of the first crown sipes 41 and outer ends 42b on the second longitudinal edge 15b side of the second crown sipes 42 is preferably equal to or less than 10% of a circumferential arrangement pitch P1 (shown in FIG. 9) of the first crown sipes 41. This makes it easier for water pushed away by a middle region of the crown land portion 15 to be guided to the outer edges of these sipes when driving on wet roads, thus improving wet performance.

A length L6 in the tire axial direction of the first crown sipes 41, for example, ranges from 40% to 60% of a width W5 (shown in FIG. 9) in the tire axial direction of the ground contact surface 15s of the crown land portion 15. Note that in this document, a length of a sipe is measured by the center line of the sipe.

Preferably, the second crown sipes 42 extend beyond the axial center in the tire axial direction of the ground contact surface 15s of the crown land portion 15. The closed ends 42a of the second crown sipes 42 are located on the first longitudinal edge 15a side with respect to the closed ends 41a of the first crown sipes 41. Preferably, a length L7 in the tire axial direction of the second crown sipes 42 is greater than the length L6 in the tire axial direction of the first crown sipes 41. Specifically, the length L7 of the second crown sipes 42 preferably ranges from 65% to 85% of the width W5 in the tire axial direction of the ground contact surface 15s of the crown land portion 15. The second crown sipes 42 as such can improve on-snow performance and wet performance while maintaining steering stability.

Preferably, a minimum distance L5 in the tire circumferential direction between outer ends 43b on the first longitudinal edge 15a side of the third crown sipes 43 and outer ends 44b on the second longitudinal edge 15b side of the fourth crown sipes 44 is equal to or less than 10% of a circumferential arrangement pitch P2 (shown in FIG. 9) of the third crown sipes 43. This can improve wet performance further.

A length L8 in the tire axial direction of the third crown sipes 43 is smaller than the length L7 of the second crown sipes 42 and the length L6 of the first crown sipes 41. In addition, the closed ends 43a of the third crown sipes 43 are located on the first longitudinal edge 15a side with respect to the closed ends 44a of the fourth crown sipes 44. In some more preferred embodiments, the closed ends 43a of the third crown sipes 43 are located on the second longitudinal edge 15b side with respect to the closed ends 42a of the second crown sipes 42. The length L8 of the third crown sipes 43 ranges from 25% to 45% of the width W5 of the ground contact surface 15s of the crown land portion 15. Such third crown sipes 43 can help to improve steering stability, on-snow performance, and wet performance in a well-balanced manner.

From a similar point of view, a length L9 in the tire axial direction of the fourth crown sipes 44, for example, is smaller than the length L7 of the second crown sipes 42 and the length L6 of the first crown sipes 41. Specifically, the length L9 of the fourth crown sipes 44 preferably range from 25% to 45% of the width W5 of the ground contact surface 15s of the crown land portion 15.

The first crown sipes 41, the second crown sipes 42, the third crown sipes 43, and the fourth sipes 44 open at the ground contact surface 15s via chamfer portions 45. Such a structure can equalize the ground pressure acting on the ground contact surface 15s of the crown land portion 15, thereby improving steering stability and uneven wear resistance. Note that the configuration of the chamfer portions 35 of the first middle sipes 31 (shown in FIG. 8) can be applied to the chamfer portions 45 of these sipes, which will not be explained herein.

As illustrated in FIG. 9, the first crown sipes 41 and the second crown sipes 42 preferably open at the ground contact surface via the chamfer portions 45 over the entire length thereof. In addition, an opening width W6 at the ground contact surface 15s of each of the first crown sipes 41 is preferably constant in the longitudinal direction of the sipe, and an opening width W7 at the ground contact surface 15s of each of the second crown sipes 42 is preferably constant in the longitudinal direction of the sipe. Preferably, the opening width W7 of each of the second crown sipes 42 ranges from 80% to 120% of the opening width W6 of each of the first crown sipes 41, and in this embodiment, they are substantially the same with each other. Thus, uneven wear around the sipes can be suppressed.

Preferably, an opening width at the ground contact surface 15s of each of the third crown sipes 43 decreases continuously from the first longitudinal edge 15a toward the closed end 43a. Preferably, an opening width at the ground contact surface 15s of each of the fourth crown sipes 44 decreases continuously from the second longitudinal edge 15b toward the closed end 44a. This ensures sufficient ground contact area in a center region of the crown land portion 15, maintaining better steering stability. In the third crown sipes 43 of the present embodiment, each chamfer portion is substantially eliminated at the closed end 43a, but each chamfer portion 45 is not limited to such an aspect, and one or more chamfer portions 45 may have a chamfer width at the closed ends 43a. The same is true for the fourth crown sipes 44.

The maximum opening width W8 at the ground contact surface 15s of each of the third crown sipes 43 is smaller than the opening width W6 at the ground contact surface 15s of each of the first crown sipes 41. Specifically, the maximum opening width W8 of each of the third crown sipes 43 ranges from 75% to 90% of the opening width W6 of each of the first crown sipes 41. Similarly, the maximum opening width W9 at the ground contact surface 15s of each of the fourth crown sipes 44 is smaller than the opening width W7 of each of the second crown sipes 42. Specifically, the opening width W9 of the fourth crown sipes 44 ranges from 75% to 90% of the opening width W7 of the second crown sipes 42. The third crown sipes 43 and the fourth crown sipes 44 can help to enhance the balance between steering stability and on-snow performance.

Figure 11:
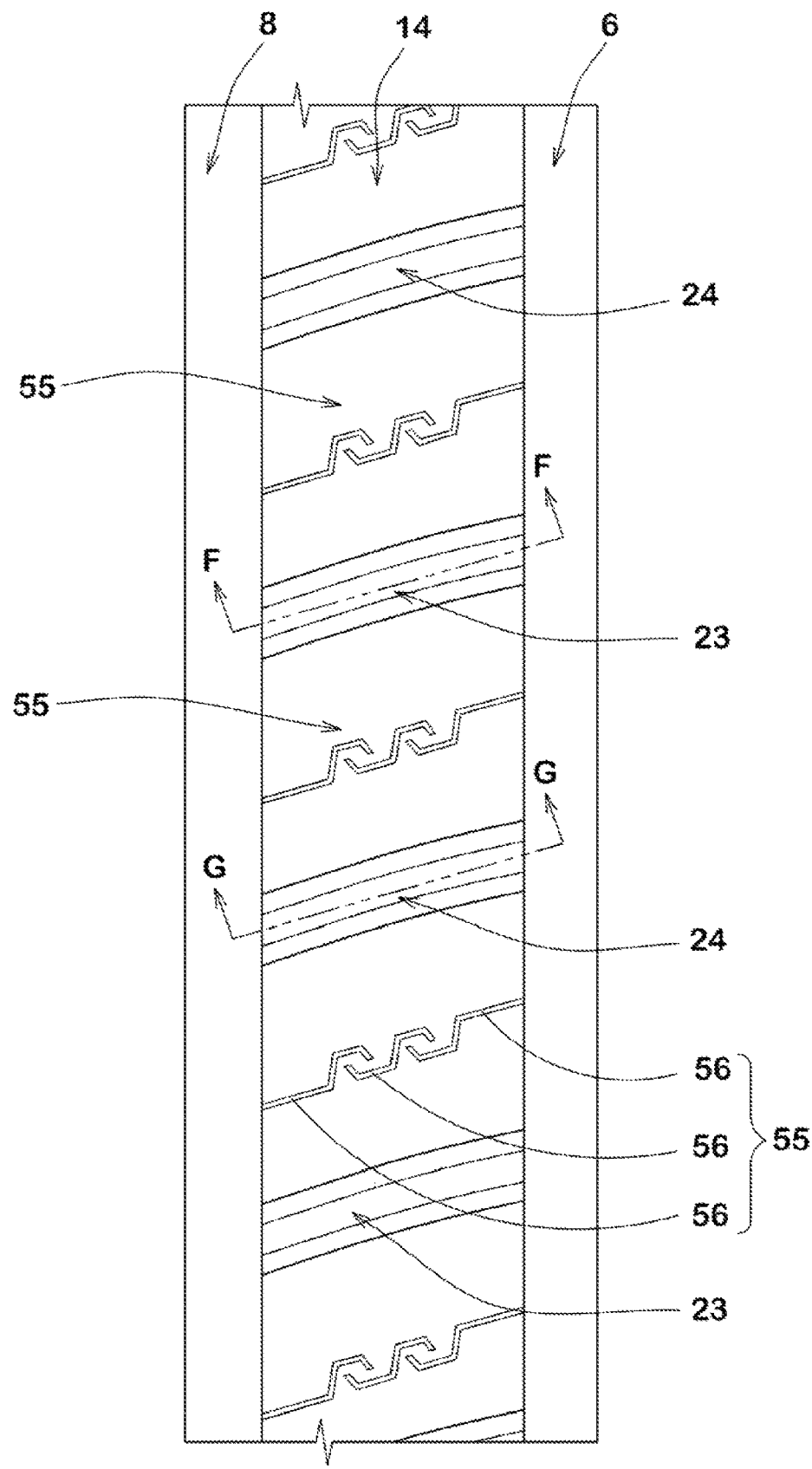
FIG. 11 is an enlarged view of a second middle land portion of FIG. 1.

FIG. 11 illustrates an enlarged view of the second middle land portion 14. As illustrated in FIG. 11, the second middle land portion 14 is provided with third middle lateral grooves 23 and fourth middle lateral grooves 24 which are arranged alternately in the tire circumferential direction. The third middle lateral grooves 23 and the fourth middle lateral grooves 24 have the same shape in a tread plan view, and extend across the second middle land portion 14 entirely in the tire axial direction. In addition, the third middle lateral grooves 23 and the fourth middle lateral grooves 24 are inclined with respect to the tire axial direction in the same direction as the middle lateral grooves 20 (shown in FIG. 2). An angle of the third middle lateral grooves 23 and the fourth middle lateral grooves 24 with respect to the tire axial direction is smaller than an angle of the middle lateral grooves 20 (shown in FIG. 2) with respect to the tire axial direction and an angle of the sipes provided on the crown land portion 15 (shown in FIG. 9) with respect to the tire axial direction. Specifically, an angle of the third middle lateral grooves 23 and the fourth middle lateral grooves 24 with respect to the tire axial direction, for example, ranges from 10 to 20 degrees. On the other hand, the third middle lateral grooves 23 and the fourth middle lateral grooves 24 differ in groove bottom structure.

Figure 12:
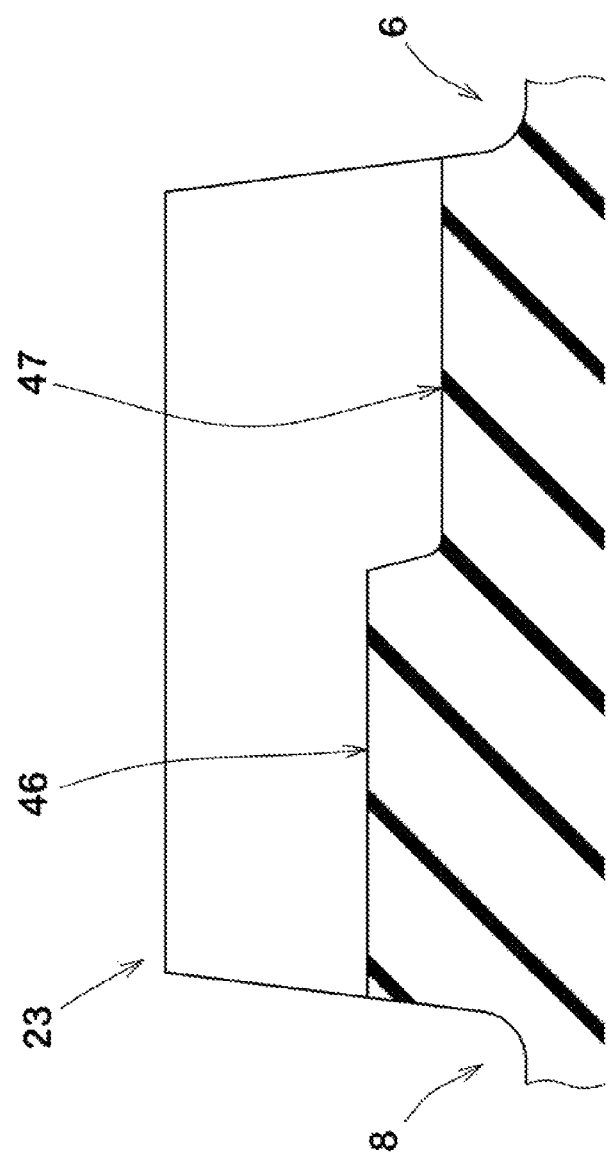
FIG. 12 is a cross-sectional view taken along the line F-F of FIG. 11.
Figure 13:
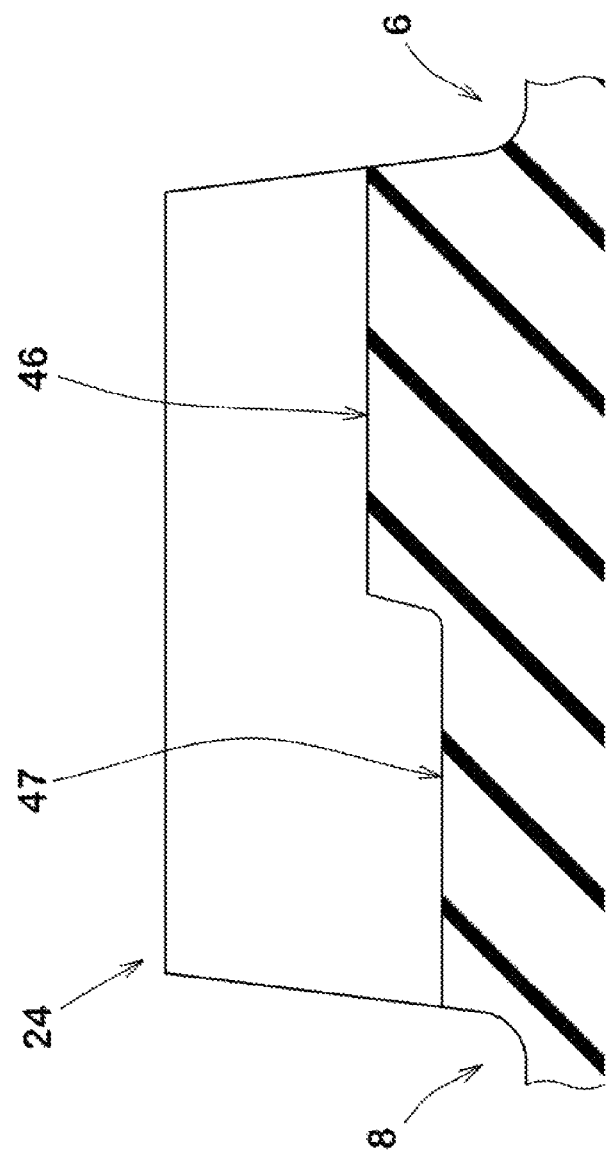
FIG. 13 is a cross-sectional view taken along the line G-G of FIG. 11.

FIG. 12 illustrates a cross-sectional view taken along the line F-F of FIG. 11. As illustrated in FIG. 12, the third middle lateral grooves 23 each have a shallow groove portion 46 on the second crown circumferential groove 8 side and a deep groove portion 47 on the second shoulder circumferential groove 6 side. FIG. 13 illustrates a cross-sectional view taken along the line G-G of FIG. 11. As illustrated in FIG. 13, the fourth middle lateral groove 24 have substantially the inverted shape of the third middle lateral grooves 23. That is, the fourth middle lateral grooves 24 each have a deep groove portion 47 on the second crown circumferential groove 8 side and a shallow groove portion 46 on the second shoulder circumferential groove 6 side. In this embodiment, the third middle lateral grooves 23 and the fourth middle lateral grooves 24 are provided alternately in the tire circumferential direction, which improve the uneven wear resistance and the steering stability.

For the shallow groove portions 46 of the third middle lateral grooves 23 and the fourth middle lateral grooves 24, the shallow groove portions 36 of the middle lateral grooves 20 (shown in FIG. 7) of the middle lateral grooves 20 described above can be applied to the shallow groove portions 46 of the third middle lateral grooves 23 and the fourth middle lateral grooves 24. Similarly, for the deep groove portions 47 of the third middle lateral grooves 23 and the fourth middle lateral grooves 24, the deep groove portions 37 of the middle lateral grooves 20 (shown in FIG. 6) of the middle lateral grooves 20 described above can be applied to the deep groove portions 47 of the third middle lateral grooves 23 and the fourth middle lateral grooves 24.

As illustrated in FIG. 11, the second middle land portion 14 is provided with a plurality of middle sipe groups 55 each of which includes a plurality of bent sipes 56 arranged in the tire axial direction. The middle sipe groups 55 are spaced in the tire circumferential direction. In the present embodiment, each middle sipe group 55 is configured such that the plurality of bent sipes 56 is arranged so as to overlap partially in the tire axial direction with each other. The bent sipes 56 each include a convex part on one side or the other in the tire circumferential direction. The middle sipe groups 55 are difficult to open during braking and driving, so that snow and ice are less likely to clog the inside of the sipes, and thus excellent on-snow performance can be maintained.

Figure 14:
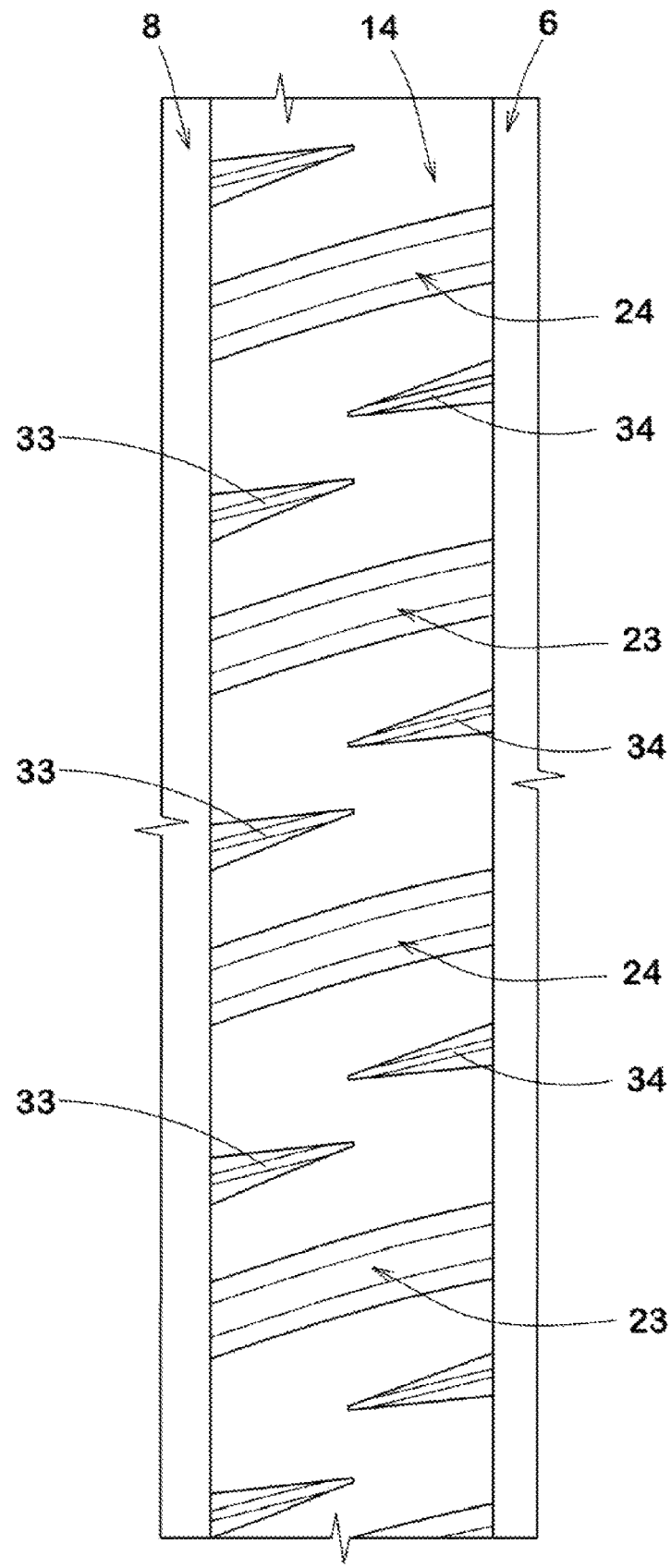
FIG. 14 is an enlarged view of the second middle land portion in accordance with another embodiment of the present disclosure.

The present disclosure is not limited to the second middle land portion 14 shown in FIG. 11. FIG. 14 illustrates an enlarged view of the second middle land portion 14 in accordance with another embodiment of the present disclosure. As illustrated in FIG. 14, the second middle land portion 14 according to this embodiment is provided with a plurality of third middle sipes 33 and a plurality of fourth middle sipes 34, in addition to the third middle lateral grooves 23 and the fourth middle lateral grooves 24 described above. The third middle sipes 33 extend from the second crown circumferential groove 8 and are terminated in the ground contact surface of the second middle land portion 14. The fourth middle sipes 34 extend from the second shoulder circumferential groove 6 and are terminated in the ground contact surface. The third middle sipes 33 and the fourth middle sipes 34 are inclined, for example, in the same direction as the third middle lateral grooves 23 and the fourth middle lateral grooves 24 with respect to the tire axial direction. An angle of these sipes with respect to the tire axial direction ranges, for example, from 10 to 20 degrees. For the third middle sipes 33 and the fourth middle sipes 34, the configuration of the first middle sipes 31 or the second middle sipes 32 described above can be applied.

In yet another embodiment of the second middle land portion 14, for example, between the adjacent third and fourth middle lateral grooves 23 and 24 in the tire circumferential direction, one or more middle sipe groups 55 described above (shown in FIG. 11) and one or more third and fourth middle sipes 33 and 34 shown in FIG. 14 may be arranged (not shown). Such an arrangement of the sipes can help to further enhance on-snow performance.

As illustrated in FIG. 1, the first shoulder land portion 11 is provided with a plurality of first shoulder lateral grooves 51 and a plurality of first shoulder sipes 52. The first shoulder lateral grooves 51 and the first shoulder sipes 52 extend, for example, from the first shoulder circumferential groove 5 to at least the first tread edge T1. In addition, the second shoulder land portion 12 is provided with a plurality of second shoulder lateral grooves 53 and a plurality of shoulder sipe groups 60 each of which includes a plurality of bent sipes 61 arranged in the tire axial direction. The shoulder sipe groups 60 have substantially the same configuration as the middle sipe groups 55 described above. These grooves and sipes can help to further improve on-snow performance.

Although the tire according to one or more embodiments of the present disclosure has been described in detail above, the present disclosure is not limited to the specific embodiments described above, and can be embodied in various ways.

EXAMPLE

Pneumatic tires of size 245/40ZR18 having the basic pattern shown in FIG. 1 were prepared. Also, as Comparative example, pneumatic tires were prepared in which the first middle land portion has a plurality of middle lateral grooves extending at an angle with respect to the tire axial direction with a constant groove width without including the circumferential groove portions (not shown). The middle lateral grooves of Comparative example extend in the tire axial direction with a constant groove depth. Further, the groove depth of each middle lateral groove of the comparative example is determined so that the groove volume is substantially the same as the groove volume of each middle lateral grooves of Example. Furthermore, except for the above-mentioned items, Example and the comparative example have substantially the same configuration. Then, steering stability on dry roads and on-snow performance were tested for Example and Comparative examples. Common specifications and test methods for each test tire are as follows.
 Rim size: 18×8.5 J
 Tire pressure: 240 kPa for all wheels
 Test vehicle: 2000 cc displacement, rear wheel drive
 Tire mounting location: All wheels
Steering Stability on Dry Road Test:
 The steering stability when the test vehicle was driven on a dry road surface was evaluated by the senses of the driver. The test results are indicated in Table 1 using a score with the steering stability of Comparative example being 100, and the larger the number, the better the steering stability.

On-Snow Performance Test:
 When the above test vehicle was driven on snow, the performance on snow was evaluated by the senses of the driver. The test results are indicated in table 1 using a score with the on-snow performance of Comparative example being 100, and the larger the number, the better the on-snow performance.
 Table 1 shows the test results.

TABLE 1

|  | Comparative example | Example |
|---|---|---|
| Steering stability on dry roads (score) | 100 | 100 |
| On-snow performance (score) | 100 | 105 |

As a result of the test, it is confirmed that the tire of Example exhibits excellent on-snow performance while maintaining steering stability on dry roads.

Additional Notes

The present disclosure includes the following aspects.
[Note 1]
 A tire comprising:
  a tread portion comprising a first tread edge, a second tread edge, a first middle land portion arranged between the first tread edge and the second tread edge, wherein
  the first middle land portion comprises a first longitudinal edge extending in a tire circumferential direction on a first tread edge side, a second longitudinal edge extending in the tire circumferential direction on a second tread edge side, and a ground contact surface between the first longitudinal edge and the second longitudinal edge,
  the first middle land portion is provided with a plurality of middle lateral grooves that traverses the first middle land portion completely in a tire axial direction,
  at least one of the plurality of middle lateral grooves comprises a first groove portion extending in the tire axial direction from the first longitudinal edge, and a second groove portion extending in the tire axial direction from the second longitudinal edge,
  the first groove portion and the second groove portion are offset in the tire circumferential direction to form a pair of circumferential groove edges extending in the tire circumferential direction between a pair of groove edges of the first groove portion and a pair of groove edges of the second groove portion, and
  a maximum groove depth of the first groove portion is different from a maximum groove depth of the second groove portion.
[Note 2]
 The tire according to note 1, wherein
  each of the plurality of middle lateral grooves comprises the first groove portion and the second groove portion,
  the plurality of middle lateral grooves comprises a plurality of first middle lateral grooves and a plurality of second middle lateral grooves,
  each of the plurality of first middle lateral grooves comprises the first groove portion having a maximum groove depth smaller than a maximum groove depth of the second groove portion,
  each of the plurality of second middle lateral grooves comprises the first groove portion having a maximum groove depth greater than a maximum groove depth of the second groove portion, and the plurality of first middle lateral grooves and the plurality of second middle lateral grooves are arranged alternately in the tire circumferential direction.

[Note 3]

The tire according to note 1 or 2, wherein a length in the tire circumferential direction of the pair of circumferential groove edges is smaller than the maximum groove width of the first groove portion and the maximum groove depth of the second groove portion.

[Note 4]

The tire according to any one of notes 1 to 3, wherein the at least one of the plurality of middle lateral grooves comprises a circumferential groove portion arranged between the first groove portion and the second groove portion, and a maximum groove depth of the circumferential groove portion is smaller than the maximum groove depth of the first groove portion and the maximum groove depth of the second groove portion.

[Note 5]

The tire according to any one of notes 1 to 4, wherein the first middle land portion is further provided with at least one circumferential sipe extending across the at least one of the plurality of middle lateral grooves in the tire circumferential direction.

[Note 6]

The tire according to note 5, wherein the first middle land portion is further provided with at least one first middle sipe extending from the first longitudinal edge and being in communication with the at least one circumferential sipe.

[Note 7]

The tire according to note 5 or 6, wherein the first middle land portion is further provided with at least one second middle sipe extending from the second longitudinal edge and being in communication with the at least one circumferential sipe.

[Note 8]

The tire according to any one of notes 1 to 7, wherein the tread portion has a designated mounting direction on a vehicle, and the first tread edge is located outside the vehicle when mounted on the vehicle.

The invention claimed is:

1. A tire comprising: a tread portion comprising a first tread edge, a second tread edge, a first middle land portion arranged between the first tread edge and the second tread edge, wherein the first middle land portion comprises a first longitudinal edge extending in a tire circumferential direction on a first tread edge side, a second longitudinal edge extending in the tire circumferential direction on a second tread edge side, and a ground contact surface between the first longitudinal edge and the second longitudinal edge, wherein the first middle land portion is provided with a plurality of middle lateral grooves, each of the plurality of middle lateral grooves traversing the first middle land portion in a tire axial direction, wherein each of the plurality of middle lateral grooves comprises: a first groove portion extending in the tire axial direction from the first longitudinal edge, a second groove portion extending in the tire axial direction from the second longitudinal edge, and a circumferential groove portion between the first groove portion and the second groove portion, wherein the first groove portion and the second groove portion are shifted from each other in the tire circumferential direction, and extend parallel to each other while inclined with respect to the tire axial direction, wherein a maximum groove depth of the first groove portion is different from a maximum groove depth of the second groove portion, wherein the first middle land portion is provided with circumferential sipes, first middle sipes and second middle sipes, wherein the circumferential sipes are arranged at intervals in the tire circumferential direction, and each extend substantially straight in the tire circumferential direction so as to have a first end on one side in the tire circumferential direction and a second end on the other side in the tire circumferential direction, wherein the first middle sipes extend straight in parallel to the first groove portions and the second groove portions from the respective first ends of the circumferential sipes to the first longitudinal edge, wherein the second middle sipes extend straight in parallel to the first groove portions and the second groove portions from the respective second ends of the circumferential sipes to the second longitudinal edge, wherein an intersecting angle between each of the circumferential sipes and one of the first middle sipes is an acute angle, and wherein an intersecting angle between said each of the circumferential sipes and one of the second middle sipes is an acute angle, whereby, the first middle sipe, second middle sipe and circumferential sipe have a Z-shaped configuration, wherein the circumferential sipes have widths smaller than groove widths of the circumferential groove portions, and wherein the circumferential sipes traverse longitudinally the respective circumferential groove portions each passing through a central part in the groove width direction of the groove bottom of the circumferential groove portion so as to form a groove bottom sipe.

2. The tire according to claim 1, wherein a length in the tire circumferential direction of each of the circumferential groove portion's edges is smaller than a maximum groove width of the first groove portion and a maximum groove width of the second groove portion.

3. The tire according to claim 1,
wherein a maximum groove depth of the circumferential groove portion is smaller than the maximum groove depth of the first groove portion and the maximum groove depth of the second groove portion.

4. The tire according to claim 1, wherein the tire has a designated mounting direction on a vehicle such that the first tread edge is located outboard of the vehicle when the fire is mounted on the vehicle.

5. The tire according to claim 1, wherein each of the first middle sipes has an opening width in the ground contact surface which decreases from the first longitudinal edge toward the circumferential sipe to which said each of the first middle sipes is connected.

6. The tire according to claim 5, wherein each of the second middle snipes has an opening width in the ground contact surface
which decreases from the second longitudinal edge toward the circumferential sipe to which said each of the second middle sipes is connected.

7. The tire according to claim 1, wherein angles of the circumferential groove portion's edges are equal to or less than 10 degrees with respect to the tire circumferential direction.

8. The tire according to claim 1, wherein the circumferential groove portion's edges extend in parallel with the tire circumferential direction.

9. The tire according to claim 1, wherein the circumferential groove portion's edges are located entirely in a central part of the ground contact surface of the first middle land portion when divided into three equal parts in the tire axial direction.

10. The tire according to claim 1, wherein said maximum groove depth of the first groove portion is smaller than said maximum groove depth of the second groove portion.

11. A tire comprising: a tread portion comprising a first tread edge, a second tread edge, a first middle land portion arranged between the first tread edge and the second tread edge, wherein the first middle land portion comprises: a first longitudinal edge extending in a tire circumferential direction on a first tread edge side, a second longitudinal edge extending in the tire circumferential direction on a second tread edge side, and a ground contact surface between the first longitudinal edge and the second longitudinal edge, wherein the first middle land portion is provided with a plurality of middle lateral grooves each traversing the first middle land portion in a tire axial direction, wherein each of the middle lateral grooves comprises: a first groove portion extending in the tire axial direction from the first longitudinal edge; a second groove portion extending in the tire axial direction from the second longitudinal edge; and a circumferential groove portion between the first groove portion and the second groove portion, wherein the first groove portion and the second groove portion are shifted from each other in the tire circumferential direction, and extend parallel to each other while inclined with respect to the tire axial direction, and wherein a maximum groove depth of the first groove portion is different from a maximum groove depth of the second groove portion, wherein the first middle land portion is provided with circumferential sipes, first middle sipes and second middle sipes, wherein the circumferential sipes are arranged at intervals in the tire circumferential direction, and each extend substantially straight in the tire circumferential direction so as to have a first end on one side in the tire circumferential direction and a second end on the other side in the tire circumferential direction, wherein the first middle sipes extend straight in parallel to the first groove portions and the second groove portions from the respective first ends of the circumferential sipes to the first longitudinal edge, wherein the second middle sipes extend straight in parallel to the first groove portions and the second groove portions from the respective second ends of the circumferential sipes to the second longitudinal edge, wherein an intersecting angle between each of the circumferential sipes and one of the first middle sipes is an acute angle, and wherein an intersecting angle between said each of the circumferential sipes and one of the second middle sipes is an acute angle, whereby, the first middle sipe, second middle sipe and circumferential sipe have a Z-shaped configuration, wherein the circumferential sipes have widths smaller than groove widths of the circumferential groove portions, wherein the middle lateral grooves include first middle lateral grooves and second middle lateral grooves disposed one after the other in the tire circumferential direction, and wherein the circumferential sipes traverse longitudinally the respective circumferential groove portions of the first middle lateral grooves each passing through a central part in the groove width direction of the groove bottom of the circumferential groove portion so as to form a groove bottom sipe, and whereas the circumferential sipes do not connect to the second middle lateral grooves so as not to traverse the second middle lateral grooves.

12. The tire according to claim 11, wherein angles of the circumferential groove portion's edges are equal to or less than 10 degrees with respect to the tire circumferential direction.

13. The tire according to claim 11, wherein the circumferential groove portion's edges extend in parallel with the tire circumferential direction.

14. The tire according to claim 11, wherein said maximum groove depth of the first groove portion is smaller than said maximum groove depth of the second groove portion.

15. The tire according to claim 11, wherein a maximum groove depth of the circumferential groove portion is smaller than the maximum groove depth of the first groove portion and the maximum groove depth of the second groove portion.

16. The tire according to claim 11, wherein each of the first middle sipes has an opening width in the ground contact surface which decreases from the first longitudinal edge toward the circumferential sipe to which said each of the first middle sipes is connected.

17. The tire according to claim 16, wherein each of the second middle sipes has an opening width in the ground contact surface which decreases from the second longitudinal edge toward the circumferential sipe to which said each of the second middle sipes is connected.

* * * * *